United States Patent
Kyllingstad

(10) Patent No.: US 8,601,874 B2
(45) Date of Patent: Dec. 10, 2013

(54) METHOD FOR DETECTION OF A MALFUNCTION RELATED TO A FLUID AFFECTED COMPONENT IN A PISTON MACHINE

(75) Inventor: Age Kyllingstad, Algard (NO)

(73) Assignee: National Oilwell Norway AS, Stavanger (NO)

( * ) Notice: Subject to any disclaimer, the term of this patent is extended or adjusted under 35 U.S.C. 154(b) by 772 days.

(21) Appl. No.: 12/598,401

(22) PCT Filed: Apr. 21, 2008

(86) PCT No.: PCT/NO2008/000143
§ 371 (c)(1),
(2), (4) Date: Feb. 26, 2010

(87) PCT Pub. No.: WO2008/133526
PCT Pub. Date: Nov. 6, 2008

(65) Prior Publication Data
US 2010/0189580 A1    Jul. 29, 2010

(30) Foreign Application Priority Data
Apr. 30, 2007   (NO) .................................. 20072230

(51) Int. Cl.
*G01N 29/14*    (2006.01)
*G01M 3/02*    (2006.01)
*F04B 19/00*    (2006.01)

(52) U.S. Cl.
USPC ........................... 73/587; 73/40.5 A; 417/437

(58) Field of Classification Search
USPC .............................. 73/40.5 A, 587
See application file for complete search history.

(56) References Cited

U.S. PATENT DOCUMENTS

| | | | |
|---|---|---|---|
| 5,650,943 A | 7/1997 | Powell et al. | |
| 5,720,598 A | 2/1998 | de Chizzelle | |
| 6,247,353 B1* | 6/2001 | Battenberg et al. | 73/40.5 A |
| 6,260,004 B1* | 7/2001 | Hays et al. | 702/183 |
| 2005/0257618 A1* | 11/2005 | Boken | 73/587 |

(Continued)

FOREIGN PATENT DOCUMENTS

| | | |
|---|---|---|
| DE | 19819499 A1 | 11/1999 |
| EP | 0489597 A | 10/1992 |

(Continued)

OTHER PUBLICATIONS

International Search Report and Written Opinion for App. No. PCT/NO2008/000143 dated Aug. 8, 2008 (9 p.).

(Continued)

*Primary Examiner* — Hezron E Williams
*Assistant Examiner* — Gregory J Redmann
(74) *Attorney, Agent, or Firm* — Conley Rose, P.C.

(57) ABSTRACT

A method for detection of a leak in a fluid affected component of a piston machine includes obtaining a vibration signal from a vibration sensor disposed proximate to at least one valve block of the piston machine. The vibration signal includes vibration generated by valves in the valve block. The method further includes presenting the obtained vibration signal for analysis by at least one of a human or a computer, analyzing the obtained vibration signal with respect to revealing a malfunction related to a fluid affected component of the piston machine, and selecting the obtained vibration signal emitted from the valve block during the closed periods of the valves for presentation.

12 Claims, 2 Drawing Sheets

(56) References Cited

U.S. PATENT DOCUMENTS

| | | | |
|---|---|---|---|
| 2006/0174707 A1* | 8/2006 | Zhang | 73/592 |
| 2007/0068225 A1* | 3/2007 | Brown | 73/40.5 A |
| 2008/0006089 A1* | 1/2008 | Adnan et al. | 73/587 |

FOREIGN PATENT DOCUMENTS

| | | |
|---|---|---|
| EP | 0570229 A | 11/1993 |
| GB | 2413850 A | 11/2005 |
| GB | 2419671 A | 5/2006 |
| JP | 59020589 A | 2/1984 |
| JP | 59176643 A | 10/1984 |
| JP | 03013837 A | 1/1991 |
| WO | 95/25264 A | 9/1995 |
| WO | 03/087754 A1 | 10/2003 |
| WO | 2006112721 A1 | 10/2006 |
| WO | 2008/081368 A | 7/2008 |

OTHER PUBLICATIONS

International Preliminary Report on Patentability for App. No. PCT/NO2008/000143 dated May 26, 2009 (10 p.).

* cited by examiner

METHOD FOR DETECTION OF A MALFUNCTION RELATED TO A FLUID AFFECTED COMPONENT IN A PISTON MACHINE

CROSS-REFERENCE TO RELATED APPLICATION

The present application claims the benefit of priority to PCT/NO2008/000143 filed Apr. 21, 2008, which is hereby incorporated herein by reference in its entirety for all purposes, and claims the benefit of priority to Norwegian Application No. 20072230 filed Apr. 30, 2007, which is also incorporated herein by reference in its entirety for all purposes.

STATEMENT REGARDING FEDERALLY SPONSORED RESEARCH OR DEVELOPMENT

Not Applicable.

SUMMARY

This invention concerns detection of a malfunction related to a fluid affected component in a piston machine. More specifically the invention concerns a method for detection of malfunction related to a fluid affected component in a piston machine, where the method includes:
- attaching a vibration sensor to or near at least one valve block of the piston machine (1);
- measuring the vibrations from the valve block;
- presenting the obtained vibration signal from the vibration sensor for analysis by a human or a computer; and
- analyzing the signal with respect to reveal a leakage in the piston machine.

The term fluid affected component relates to a component that is in contact with the fluid flowing through the piston machine. Typical fluid affected components are inlet and discharge valves, pistons and seals.

Detection, localization and quantification of leaks related to piston machines (hereafter referred to as pumps, for simplicity) is important for minimizing costs and down time related to valve and piston failures. Today's practice provides no certain way to localize leaks. A leak in one or more valves or pistons will cause a drop in the volumetric efficiency. If a pump is running at a constant speed, this reduction in efficiency also causes the mean discharge pressure to drop. However, a pressure drop can result also from leaks outside the pump or even reductions in the flow resistance not related to leaks. Such reductions in flow resistance may arise from changes in temperature and viscosity or it can come from a bypass of one or more flow restrictors. Therefore, a pressure drop cannot be used for localizing the leak.

Other malfunctions of components of a pump affect the flow. A broken valve spring will cause the related valve to close later and thus reduce the volumetric efficiency of the pump.

Skilled operators can sometimes localize malfunctions such as valve leaks by listening to the sound of the pump by a simple stethoscope, normally in the form of a screwdriver or a wooden stick held between the valve block and the human ear. There are however many disadvantages related to this method, such as:
- The localization is uncertain, even with a trained and experienced person.
- It is generally not possible to distinguish between an inlet valve and a discharge valve.
- It will be almost impossible to detect delayed valve closing as a result of a broken valve return spring.
- The person has to make the diagnosis in hazardous area because he/she must stay very close to the pump while it is running.
- The person will also be exposed to injuriously high sound pressure levels, often exceeding 100 dBA near the pump.
- The diagnosis is time consuming.
- The check will only be carried out at certain intervals.

A leak in a valve or piston manifests itself by several effects that can be picked up by various sensors. The most striking changes due to a growing leak are:
- The discharge pressure starts dropping, provided that the loss in pressure is not compensated by an increase in the total pump rate.
- The discharge pressure from a pump starts to vary cyclically with a period equal to the pump rotation period.
- The suction pressure to a pump also starts to vary cyclically with the same period.
- Low frequency and cyclic vibrations increase, especially on the flexible hoses, both the high-pressure hose and the low-pressure hose.
- The high frequency vibration level of the pump near the leak source increases.

Prior art include several methods for leak detection that are utilizing the first four features. According to U.S. Pat. No. 5,720,598 the pressure from at least one pump in combination with the rotational speed of the pump, measured in time, are utilized to determine and analyze the pump harmonics for the presence of a defect and the type of defect. The specific pump unit having the defect is then determined.

WO document 03/087754 describes a method using a combination of active speed variation tests and harmonic analysis to both quantify and localize a leakage.

Experience has proven that these prior art methods do not work satisfactorily in field environments. It is particularly difficult to pinpoint the actual valve leaking.

A leak flow in the reverse direction through a defective valve will, as mentioned above, generate high frequency vibrations in the valve block. The vibrations may be picked up by an accelerometer placed close to the leak source, for instance on the outside surface of a valve block.

U.S. Pat. No. 5,650,943 describes a method utilizing portable equipment where transducers are applied to appropriate locations in the valve system to obtain sound signals. The signals are fast Fourier transformed into valve signatures. The differential signature method is used to make determinations of valve leaks. The method includes comparing obtained signals with stored signals from the actual valve, where the stored signal is obtained from a previously made database. The method is designed to detect leaks in static valves, i.e. valves normally having a steady state flow rate through it. It is not designed for detecting leaks in check valves rectifying the flow in piston machines. Hence it is not able to distinguish between leaks in the inlet valve and the discharge valve in a valve block.

The object of the invention is to overcome or reduce at least one of the drawbacks of the prior art.

The object is achieved according to the invention by the features as disclosed in the description below and the following patent claims.

A method in accordance with the invention for detection of malfunction related to a fluid affected component of a piston machine includes:
- attaching a vibration sensor to at least one valve block of the piston machine (1);
- measuring the vibrations from the valve block;

presenting the obtained vibration signal from the vibration sensor for analysis by a human or a computer; and analyzing the signal with respect to reveal a malfunction related to a fluid affected component in the piston machine.

Possible malfunctions include a leak past the pumps piston or valve, as well as late closing of a valve due to a broken or weak valve spring.

A vibration sensor in the form of an accelerometer is well suited to pick up the accelerations of the vibration. It is well known by a skilled person that airborne sound from a leaking valve can barely be heard or detected with ear or ordinary microphones. The reasons are the relatively poor emission of this sound, and the high background sound noise level often encountered when the pump is running. However, tests have shown that accelerometer signals converted into sound via earphones or speakers are very suitable for leak detection and leak localization. In order to suppress vibrations originating from other sources, the acceleration signal from the vibration sensor can optionally be band pass filtered. Experience has shown that the leaks in mud pump valves will produce vibrations over a wide range of frequencies, not much different from white noise vibrations. In comparison, the background vibrations from other sources are dominated by low and mid-range frequencies, typically up to 1 kHz. Therefore the optional band pass filter should cover the treble band from 3-15 kHz where the leak-induced vibrations are relatively most pronounced.

The intensity of the measured vibrations increases rapidly with the pump speed and increasing discharge pressure. Preferably the amplitudes of the vibration signals are scaled to reflect this feature.

The vibration signals are, when emitted for instance by a loudspeaker, surprisingly well suited for identification of a leak by the human ear. When the signals are processed as de-scribed above and disturbing noises to a large extent are filtered away, the ear also easily identifies the severity of a leak, in relative terms.

The vibration signal may in an unprocessed or processed form be presented in different ways for an operator to decide which of the valves are leaking or not.

The operator may listen in real time to the different valve blocks. This can be done remotely by use of an earphone or a load speaker system, and a switch selecting one vibration sensor (valve block) at a time. An operator will quickly and without much training, determines at which valve block the leak is developing. Volume and equalizer filter adjustments can optionally be included to make the leak sound more pronounced.

The operator may listen to recordings of the vibration signals. This method opens the possibility to playback in a slower rate thus making the leak sound even more striking for the human ear. Another advantage is that sound files can easily be exported to locations at a great distance from the recording equipment.

The vibration signals may alternatively be visualized in a graph containing signals from all valve modules. When the signals are properly and equally scaled on the graphs, it is easy for an operator to spot the leaky valve or valves.

Further processing of the signal may enhance the contrast between a healthy valve and a leaky valve. Examples of such signal processing are logarithmic scaling of the signal amplitude and spectrum analysis showing spectra versus time.

In the same way as for the audio options, the signal visualization can either be real time or based on files of recorded data.

Advantageously the method further includes:

attaching a sensor to the piston machine that renders a signal for calculating at least the rotational speed or shaft position of the at least one piston machine;

calculating the angular speed and shaft position of the piston machine; and relating the signals from the vibration sensor with the shaft position of the piston machine in order to reveal which angle sector of shaft rotation corresponds to the leak vibration.

As the shaft position of the pump is known at all time, more advanced filtering techniques providing more efficient suppression of the valve closing/opening impacts in various angle sectors may be applied.

In order to quantify the leak, the root mean square (RMS) value of the filtered signal is calculated. The RMS value basically gives an indication of the energy of the measured signal. The signal energy will increase as a leak is developing.

In the vibration signal, peak acceleration arising from the events of opening and closing the valves will, represent components in the same frequency range as the leak accelerations. To minimize the disturbance from these components, which are present also for healthy valves, these peak acceleration signals could be suppressed. One relatively simple way of suppression is clipping, since these peaks often has much higher amplitude but shorter duration than the leak induced vibrations. If the acceleration signal is clipped to levels matching the leak noise level, the subsequently calculated RMS acceleration level will be more sensitive to the leak vibrations. An alarm based on the RMS value of the vibrations originating from a leak changes beyond a preset value may be set.

A broken or weak valve spring will reveal itself by delayed closing of the actual valve.

Both the general vibration level and the leak induced vibration level changes much with pump speed and discharge pressure. Leak detection from induced vibration accelerations must therefore be a comparative analysis where the relative vibration level, as compared with the other valve blocks, and not the absolute vibration level, should trigger a leak detection alarm. The preset alarm value should be adapted to the speed of the piston machine (1).

The malfunction localization system described here is based on the fact that leak and valve closing induced vibrations attenuates rapidly with the distance from the source. They become relatively weak at the neighbor valve blocks. Even if the leak induced vibrations sometimes can be picked up by accelerometers at non-leaking valve blocks, they are far more intense at the leaking block.

The method according the invention discloses a relatively simple and reliable way of detecting a malfunction related to a fluid affected component in a piston machine, typically a malfunctions in the form of a leak or a broken valve spring. The method may further be extended to localizing the leaking valve by relating the leak-induced vibrations with the sector angle of the pump shaft at which they appear.

BRIEF DESCRIPTION OF THE DRAWINGS

In the following there is described a non-limiting example of use of the method illustrated in the accompanying drawings, in which.

DETAILED DESCRIPTION

Figure 1:
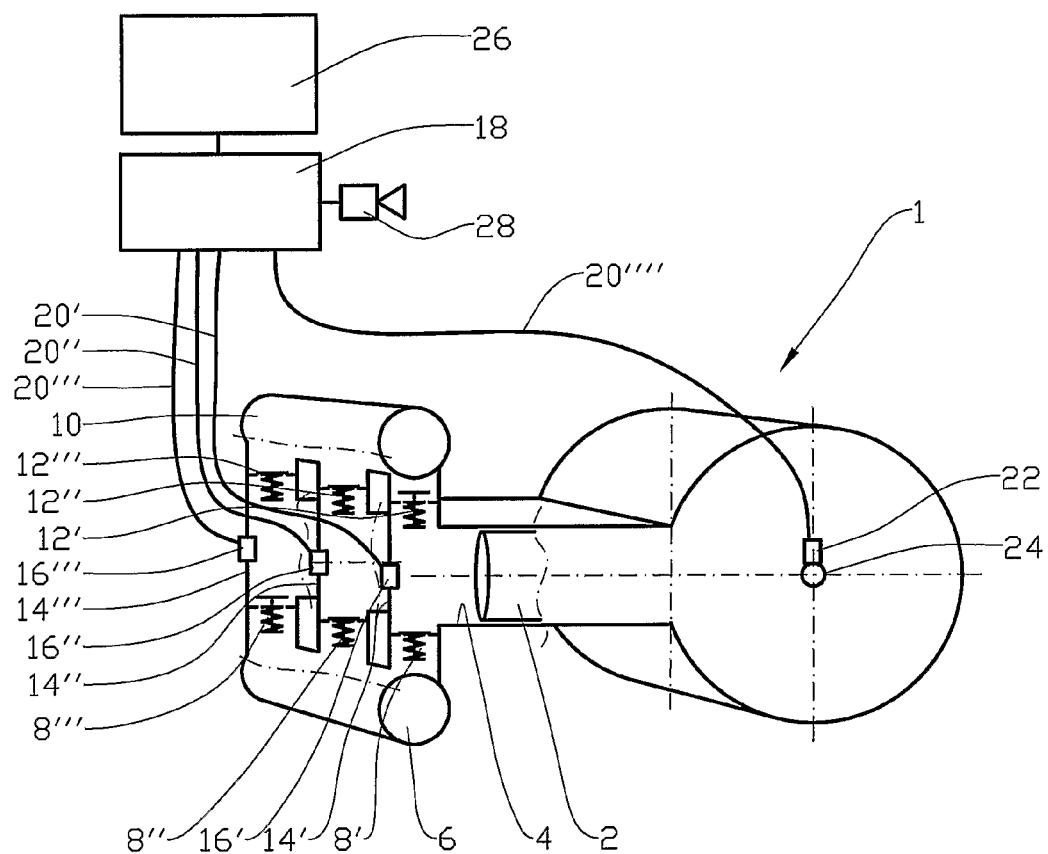
FIG. 1 schematically shows a pump with vibration sensors attaches to each valve block of the pump as well as a rotary angle transmitter positioned at the pump shaft.

On the drawings the reference numeral 1 denotes a so-called triplex pump, below termed pump, provided with three individually acting pistons 2, extending through their respective cylinders 4. Only the first piston 2 and corresponding cylinder 4 is shown. The cylinders 4 communicate with an inlet manifold 6 through their respective inlet valves 8', 8" and 8''', and an outlet manifold 10 through their respective discharge valves 12', 12" and 12'''.

The first inlet valve 8' and the first discharge valve 12' are built into a first valve block 14' that communicates with the first cylinder 4. In the same way the second inlet valve 8" and the second discharge valve 12" are built into a second valve block 14", and the third inlet valve 8''' and the third discharge valve 12''' are built into a third valve block 14'''.

On smaller pumps, the valve blocks 14', 14" and 14''' may be parts of a common piece of metal.

A first vibration sensor 16' that communicates with a computer 18 through a first cable 20', is attached to the first valve block 14'. A second vibration sensor 16" that communicates with the computer 18 through a second cable 20", is attached to the second valve block 14", while a third vibration sensor 16''' that communicates with the computer 18 through a third cable 20''', is attached to the third valve block 14'''.

A rotary angle transmitter 22 that communicates with the computer 18 through a fourth cable 20'''', is arranged to measure the rotary angle of the crankshaft 24 of the pump 1.

The computer 18 is equipped with a screen 26 and a loudspeaker 28.

The sensors 16', 16" and 16''', the transmitter 22 and the computer 18 are of types that are known per se, and the computer 18 is programmed to carry out the calculations in question.

Vibrations sensed from the valve blocks 14', 14" and 14''' are picked up by the vibration sensors 16', 16" and 16''' respectively, and transmitted as signals to the computer 18.

The signals are prepared as described in the general part of the description by volume adjustment and optional filtering and then transmitted trough the loud speaker 28.

Switched between the signals originating from each of the vibration sensors 16', 16" and 16''' should be done when listening to the signals when emitted from the loud speaker 28. When a leak is developing, a distinctive "hizzing" noise that appears at regular intervals will be transmitted. The loudness of the hizzing noise increases as the leak develops.

The leak will be present at that of the valve blocks 14', 14" or 14''' where the related vibration sensor 16', 16" or 16''' is emitting the strongest signal, and hence, the loudest noise.

Figure 2:
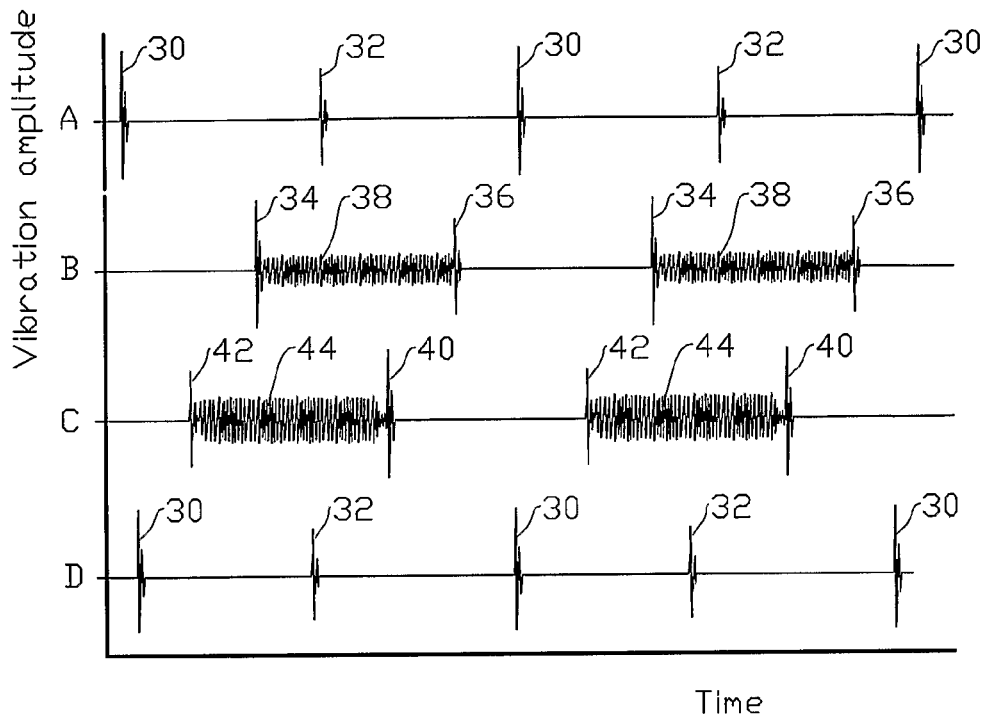
FIG. 2 shows an idealized graph illustrating the prepared vibration signal from the valve blocks plotted with respect to time.

The signals are also displayed on the screen 26 as a graph shown in FIG. 2 where signal A originating from the first valve block 14' shows a situation where the valves 8', 12' are healthy. Spikes 30 of the signal A reflect the vibration generated by the first inlet valve 8' closing. Spikes 32 of the signal A reflect the vibrations generated by the first discharge valve 12' closing. The graph in FIG. 2 covers approximately two revolutions of the crankshaft 24.

Signal B, originating from the second valve block 14", shows a situation where the second inlet valve 8" is developing a leak while the second discharge valve 12' is healthy. Spikes 34 of the signal B reflect the vibration generated by the second inlet valve 8" closing. Spikes 36 of the signal B show the vibration generated by the second discharge valve 12" closing. The fluid leaking past the closed second inlet valve 8" during the pump stroke generates a vibration pattern 38.

Signal C, originating from the third valve block 14''', shows a situation where the third inlet valve 8''' is healthy while the third discharge valve 12''' has developed a leak. Spikes 40 of the signal C reflect the vibration generated by the third inlet valve 8''' closing. Spikes 42 of the signal C reflect the vibrations generated by the third discharge valve 12''' closing. The fluid leaking past the closed third discharge valve 12''' during the suction stroke generates a vibration pattern 44.

Signal D shows a different situation at the first valve block 14' where the inlet valve 8' has a broken valve spring. In contrast to the healthy discharge valve 12', which has a small but normal closing delay, the abnormally delayed spikes 30 of the signal C indicates that the return spring of the inlet valve 8' has a malfunction.

The signals A, B and C are each out of phase by 120 degrees due to the pump design. Signal D is in phase with signal A. The ordinate in the graph is broken and each of the signals A, B and C are alternating about zero value.

The signals A, B, C and D in FIG. 2 are related to time along the abscissa. It is comparatively easy from these signals to pinpoint in which valve block (or blocks) 14', 14" and 14''' there is a leak. It is however, not so easily seen whether it is the inlet the valve 8', 8", 8''' or the discharge valve 12', 12", 12''' of the corresponding valve blocks 14', 14" and 14''' that are developing a leak.

From the design of the pump 1 it is known that the pump stroke extends from a rotational angle $\alpha$ to an angle $\beta$ of the crankshaft 24, and that the suction stroke extends from the angle $\beta$ and back to the angle $\alpha$. Due to fluid compressibility and valve inertia, the vibration graphs will in practice not correspond totally with the angles $\alpha$ and $\beta$.

Figure 3:
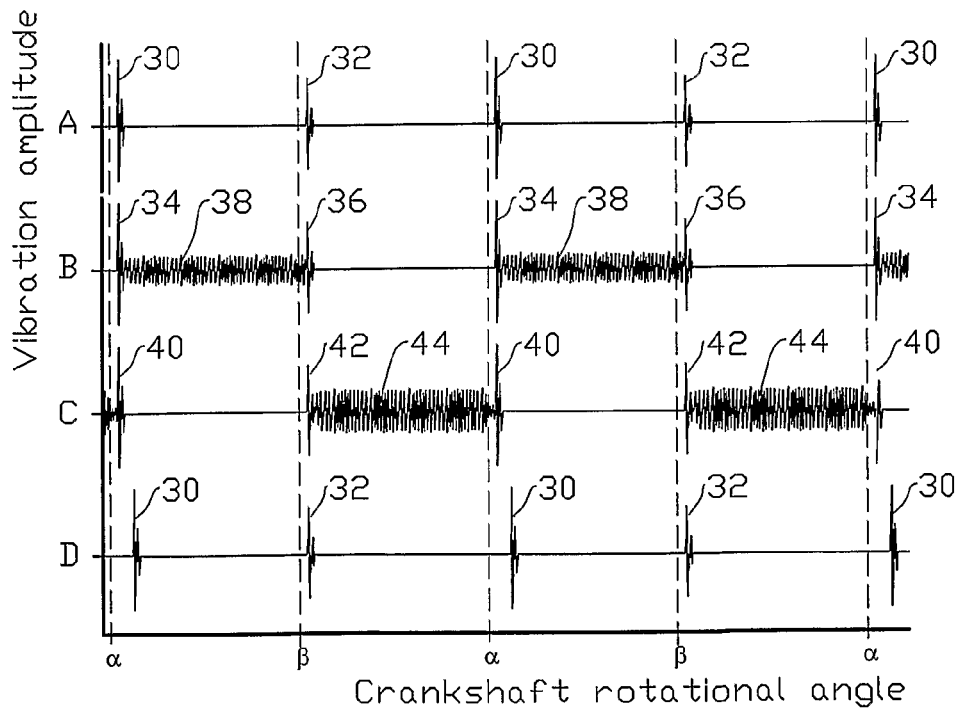
FIG. 3 shows an idealized graph illustrating the prepared vibration signal from the valve blocks plotted with respect to rotational angle of the pump's crankshaft.

By displaying the signals A, B, C and D with reference to the rotational angle of the crankshaft 24 along the abscissa on the screen 26, see FIG. 3, the signals A, B, C and D are related to the rotational angle of the crankshaft 24 as read by the transmitter 22. The signals B and C are shifted by 120 degrees and 240 degrees respectively, in FIG. 3 so as to correspond with the notation at the abscissa.

In signal B of FIG. 3, as the vibration pattern 38 appears just after the second inlet valve 8" has closed at the rotational angle $\alpha$ of the crankshaft 24, and carries on until the rotational angle $\beta$ of the crankshaft, it is apparent that the second inlet valve 8" has got a leak. Similarly, in signal C, as the vibration pattern 44 appears just after the third discharge valve 12''' has closed at the rotational angle $\beta$ of the crankshaft 24, and carries on until the rotational angle $\alpha$ of the crankshaft 24, it is also apparent that the third outlet valve 12''' has got a leak.

Signal D shows that the first inlet valve 8' has a broken valve spring while the discharge valve 12' is healthy. Spikes 30 of the signal C that reflect the vibration generated by the first inlet valve 8' closing is delayed relative the angle $\alpha$.

It can also be readily appreciated from the FIGS. 2 and 3 that the RMS value of the vibration pattern 44 is larger than that of the vibration pattern 38, indicating that leak in the third discharge valve 12''' is greater than the leak in the second inlet valve 8".

The invention claimed is:

1. A method for detection of a leak in a fluid affected component of a piston machine, the method comprising:
    attaching a vibration sensor to a valve block of the piston machine;

obtaining a vibration signal from the vibration sensor, wherein the vibration signal comprises vibrations generated by an inlet valve and a discharge valve disposed within the valve block;

presenting the obtained vibration signal for analysis by at least one of a human or a computer;

analyzing the obtained vibration signal to identify a malfunction in the inlet valve or the discharge valve; and selecting the obtained vibration signal emitted from the valve block during the closed periods of the valves for presentation.

2. The method according to claim 1, wherein the method further includes:

receiving at least one of a rotational speed signal and an angular shaft position signal from a sensor disposed on the piston machine;

calculating an angular shaft position of the piston machine; and relating the vibration signals from the vibration sensor to the angular shaft position of the piston machine in order to determine at which angle sector of shaft rotation angle corresponds to the malfunction related to a fluid affected component.

3. The method according to claim 2, wherein the method further includes:

determining that the malfunction is a leak in the inlet valve when the vibration continues between an angle α and an angle β of a crankshaft of the piston machine.

4. The method according to claim 2, wherein the method further includes:

determining that the malfunction is a leak in the outlet valve when the vibration continues between an angle β and an angle α of a crankshaft of the piston machine.

5. The method according to claim 2, wherein the method further includes:

determining that the malfunction is a damaged valve spring in the inlet valve if the valve is closing at a delay after an angle α respective β of a crankshaft of the piston machine.

6. The method according to claim 1, wherein the method further includes:

processing the obtained vibration signal from the vibration sensor to suppress vibration signals originating from other sources than the inlet valve and the discharge valve prior to presentation.

7. The method according to claim 1, wherein the method further includes:

processing the obtained vibration signal from the vibration sensor to scale the amplitude prior to presentation.

8. The method according to claim 2, wherein the method further includes:

calculating a root mean square ("RMS") value of the vibrations originating from a leak.

9. The method according to claim 8, wherein the method further includes:

setting an alarm if the RMS value of the vibrations originating from the leak change beyond a preset alarm value.

10. The method according to claim 9, wherein the preset alarm value is a function of the speed of the piston machine.

11. A piston machine, comprising:

a valve block having an inlet valve and a discharge valve disposed therein;

a crankshaft;

a vibration sensor disposed proximate to the valve block;

a computer in communication with the vibration sensor, wherein the computer is configured to select a vibration signal emitted from the vibration sensor during closed periods of the valves and, using at least the vibration signal, determine a leak in the inlet valve or the discharge valve of the piston machine.

12. The piston machine of claim 11, further comprising:

a position sensor configured to render a signal for calculating an angular shaft position and in communication with the computer, wherein the computer is further configured to calculate the angular shaft position of the piston machine and relate the selected vibration signals from the vibration sensor to the angular shaft position of the piston machine in order to determine at which angle sector of shaft rotation angle corresponds to the leak in the inlet valve or the discharge valve.

* * * * *

UNITED STATES PATENT AND TRADEMARK OFFICE
CERTIFICATE OF CORRECTION

PATENT NO. : 8,601,874 B2
APPLICATION NO. : 12/598401
DATED : December 10, 2013
INVENTOR(S) : Age Kyllingstad It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 972 days.

Signed and Sealed this
Twenty-second Day of September, 2015

Michelle K. Lee
*Director of the United States Patent and Trademark Office*